No. 12,517. REISSUED JULY 31, 1906.

J. D. TSCHOPIK.

PIPE CONNECTING MEMBER.

APPLICATION FILED MAY 28, 1906.

Witnesses.

Chas. K. Davis.

Lilian Brock

Inventor

Julius D. Tschopik

THE NORRIS PETERS CO., WASHINGTON, D. C.

UNITED STATES PATENT OFFICE

JULIUS DAVID TSCHOPIK, OF NEW ORLEANS, LOUISIANA.

PIPE-CONNECTING MEMBER.

No. 12,517. Specification of Reissued Letters Patent. Reissued July 31, 1906.

Original No. 803,940, dated November 7, 1905. Application for reissue filed May 28, 1906. Serial No. 319,211.

*To all whom it may concern:*

Be it known that I, JULIUS DAVID TSCHOPIK, a citizen of the United States, residing at New Orleans, in the parish of Orleans and State of Louisiana, have invented new and useful Improvements in Pipe-Connecting Members, of which the following is a specification.

My invention relates to plumbers' brass ferrules, soldering-nipples, and soldering-unions, &c.; and its object is to provide a device suitable for ready application to the connections to which it is to be applied and yet having means to enable it to be shipped and handled without injury thereto.

To this end my invention is embodied in preferable form in the article of manufacture hereinafter described, and illustrated in the accompanying drawings.

Figure 1:
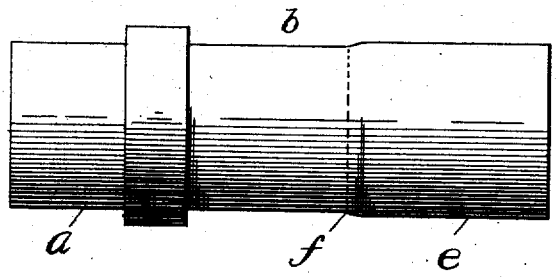
Figure 2:
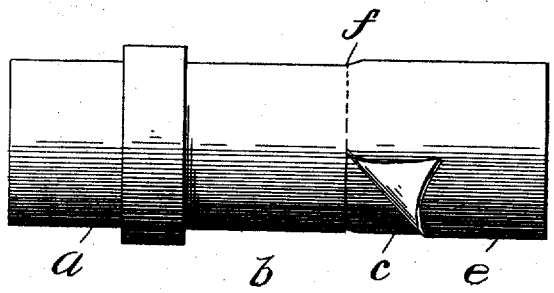
Figure 3:
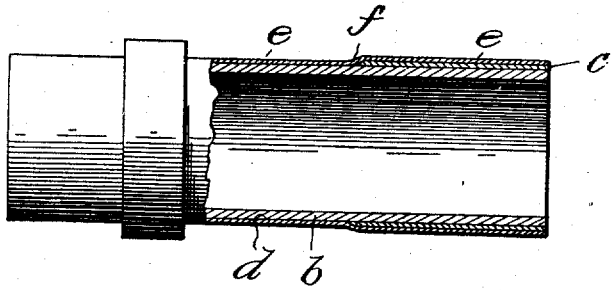

In the drawings, Figure 1 is an elevation of a soldering-nipple embodying my improvements; Fig. 2, a similar view showing the protective covering partly removed and the nipple ready for application, and Fig. 3 a sectional view.

Referring to the drawings, *a* is the body of a brass nipple, and *b* the stem thereof adapted to engage a pipe or other part to be connected. This stem must be tinned before soldering it to its connecting-pipe, and it is usual to do this at the time of making the connection. In so doing it is necessary first to clean and file the stem before soldering and then temporarily cover the part that is not to be tinned with a piece of paper to prevent the solder flowing over upon such part and adhering to it when making the wiped joint to its connecting-pipe.

In my invention the nipple or ferrule is provided for a portion of its length and extending to the end of the stem with a permanent originally-fixed coating of solder or tinning-alloy *c*. This coating extends along a limited portion of the stem, leaving an untinned portion *d*. On this part *d* is pasted or glued a protective cover *e* of paper or other suitable material. This covering extends over the tinned portion *c* and at the line of junction between the tinned and untinned portions is provided with a weakened or perforated severing-line *f*, whereby when the ferrule or nipple is to be applied to its adjoining part the covering is torn off at this severing-line, while the remaining part of the covering remains affixed to the untinned part and prevents the solder from flowing down on said part and sticking to it when the nipple is applied to the wiped joint.

It is necessary that the tinned coating be perfectly protected against tarnishing, soiling, or injury; otherwise it will not be fit for use when it is desired to apply the same.

It is clear that various changes or modifications in the details of the article may be made without departing from the scope of the invention.

Having thus described my invention, what I claim is—

1. As an article of manufacture, a metallic pipe member adapted to be secured to a connecting part and having a coating of other metal thereon, and having a protective covering for said coating secured to a part of the pipe member and extending over the coating and removable to expose said coating.

2. As an article of manufacture, a metallic pipe member adapted to be secured to a connecting part and having a coating of other metal thereon, and having a protective covering for said coating, consisting of fabric attached to a part of said member, extending over and removable from said coating.

3. As a new article of manufacture, a pipe member having a stem adapted to be soldered to a connecting part, and having an originally-affixed, permanent tinned coating thereon, and having a protective covering for said tinned coating, secured to an untinned part of the stem and extending loosely over the tinned coating and removable therefrom to expose said coating, substantially as described.

4. As a new article of manufacture a plumber's pipe member such as a ferrule, nipple, &c., having a stem adapted to be soldered to a connecting part and having a permanent originally-affixed tinned coating extending along said stem for a portion of the length of the latter, a protective coating affixed to the untinned part of the stem and extending over the coating and having a severing-line at the point of junction of the coated and uncoated portions of the stem, substantially as described.

5. As a new article of manufacture, a metallic pipe member adapted to be secured to a connecting part, and having a coating of other metal thereon, a protective covering secured to an uncoated part of said pipe, extending over said coating and having a severing-line near the juncture of the coated and uncoated parts of said member, whereby the free part of said covering may be readily detached to expose the coating and the other part remains affixed to said pipe member, serving to protect an uncoated part thereof.

In testimony whereof I affix my signature in the presence of two subscribing witnesses.

JULIUS DAVID TSCHOPIK.

Witnesses:

W. P. O'TOOLE,

C. P. GASTON.